United States Patent [19]

Swisher

[11] Patent Number: 4,695,009
[45] Date of Patent: Sep. 22, 1987

[54] BAIT ALERT FOR SPIN CAST REEL

[75] Inventor: Steven L. Swisher, Tulsa, Okla.

[73] Assignee: Brunswick Corporation, Skokie, Ill.

[21] Appl. No.: 858,031

[22] Filed: May 1, 1986

[51] Int. Cl.$^4$ .................. A01K 89/00; A01K 89/01
[52] U.S. Cl. .......................... 242/84.1 R; 242/84.2 A
[58] Field of Search .................. 242/84.2 A, 84.2 R,
    242/84.51 A, 84.1 R, 217, 218, 219; 116/307

[56] References Cited

U.S. PATENT DOCUMENTS

| | | | |
|---|---|---|---|
| 3,481,554 | 12/1969 | Hull | 242/84.2 A |
| 4,087,058 | 5/1978 | Yamasaki et al. | 242/84.51 A |
| 4,408,728 | 10/1983 | Pittman | 242/84.2 A |
| 4,548,367 | 10/1985 | Councilman | 242/84.2 R |

Primary Examiner—Billy S. Taylor
Attorney, Agent, or Firm—Wood, Dalton, Phillips, Mason & Rowe

[57] ABSTRACT

The structure is intended for incorporation into a conventional type fishing reel having a spool for retaining a supply of line, a crank handle and a drive train operable through the crank handle to direct line onto the spool. The drive train has at least one rotatable member which coacts with a clicker that is mounted on the reel movably between a first position wherein a portion of the clicker contacts the one rotating element of the drive train to produce an audible noise and a second position wherein the portion of the clicker is spaced from the drive train elements. An actuator associated with one of the rotating elements of the drive train, upon being rotated in a first direction, shifts the clicker to its first position in contact with one of the elements of the drive train. Upon the rotating element associated with the actuator being rotated oppositely to the first direction, the actuator causes the clicker to shift to its second position so that no sound will be produced as the reel is operated.

9 Claims, 7 Drawing Figures

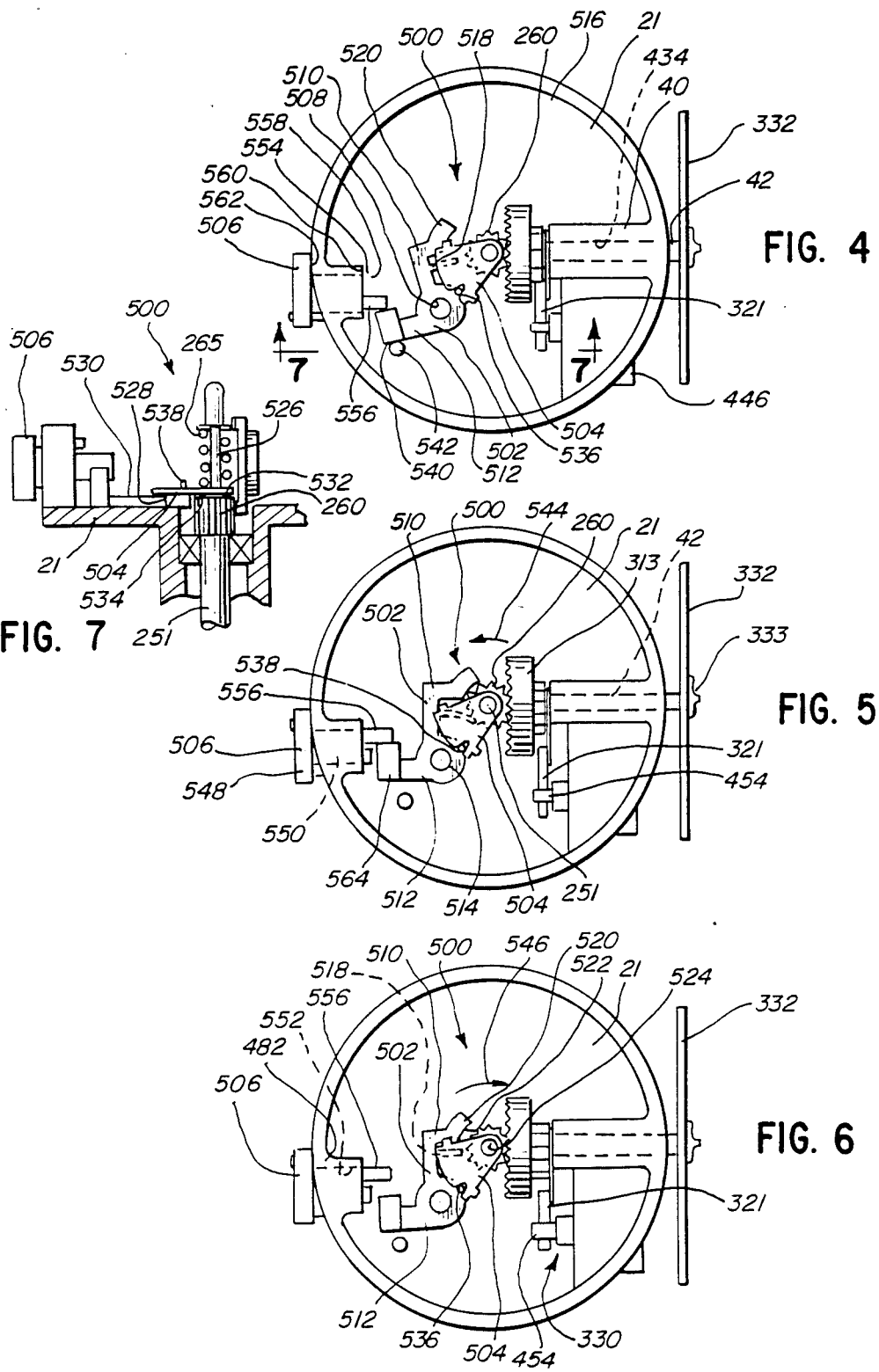

BAIT ALERT FOR SPIN CAST REEL

TECHNICAL FIELD

This invention relates to bait clickers on fishing reels and, more particularly, relates to a bait clicker that is automatically disengaged upon the users operating the crank handle to retrieve line.

BACKGROUND OF THE INVENTION

Bait clickers, or alerts, are commonly employed in all types of fishing reels. Without a warning from the bait clicker, a user of a reel with a light drag setting might not otherwise be aware that line is being drawn out either by a fish or because the bait is snagged. This is particularly a problem with today's smoothly and quietly operating reels.

It is known to provide clickers with elements that bear against a gear or the like that is rotated as the line is retrieved. With such conventional structures, generally only fixed "on" and "off" positions can be selected by the user of the reel.

The biggest drawback with the conventional reels is that if the user chooses the "on" position, once a fish is hooked the clicker will continue to operate. The clicker sound is annoying, distracting and in some reel constructions the clicker affects the smoothness of the retrieval mechanism.

To avoid this problem, one must either choose between leaving the clicker in the "off" position and risk that the removal of line might go undetected or releasing the clicker once a fish has been hooked. With the latter option one must stop reeling, hold the rod and reel with one hand and at the same time release the clicker. One thereby risks dropping the rod and reel and/or loosing the fish as the line retrieval is interrupted.

SUMMARY OF THE INVENTION

The present invention is specifically directed to overcome the above-enumerated problems in a novel and simple manner.

The inventive structure is intended for incorporation into a conventional type fishing reel having a spool for retaining a supply of line, a crank handle and a drive train operable through the crank handle to direct line onto the spool. The drive train has at least one rotatable member which coacts with a clicker that is mounted on the reel movably between a first position wherein a portion of the clicker contacts the one rotating element of the drive train to produce an audible noise and a second position wherein the portion of the clicker is spaced from the drive train elements. An actuator associated with one of the rotating elements of the drive train, upon being rotated in a first direction, shifts the clicker to its first position in contact with one of the elements of the drive train. Upon the rotating element associated with the actuator being rotated oppositely to the first direction, the actuator causes the clicker to shift to its second position so that no sound will be produced as the reel is operated.

With the above arrangement the operator is alerted to the withdrawal of line from the spool and upon operating the crank handle, the clicker disengages so that smooth and silent operation of the reel occurs.

The invention also contemplates the provision of a manual override of the actuator so that the clicker can be fixed in its second, disengaged position regardless of the rotation of the drive train members with which it is associated.

BRIEF DESCRIPTION OF THE DRAWINGS

FIG. 4 is an enlarged rear elevation view of the reel in FIG. 2 with the rear cover removed and showing a preferred form of bait alert structure according to the present invention with the structure maintained fixedly in a disengaged position;

FIG. 5 is a view similar to that in FIG. 4 with the clicker in the engaged position and with the structure set for automatic movement between engaged and disengaged positions;

FIG. 6 is a view similar to that in FIG. 4 with the structure set as in FIG. 4 and the clicker in the disengaged position; and FIG. 7 is an enlarged, fragmentary sectional view of the bait alert structure along line 7—7 of FIG. 4.

DESCRIPTION OF THE BASIC STRUCTURE AND OPERATION OF THE FISHING REEL

Figure 1:
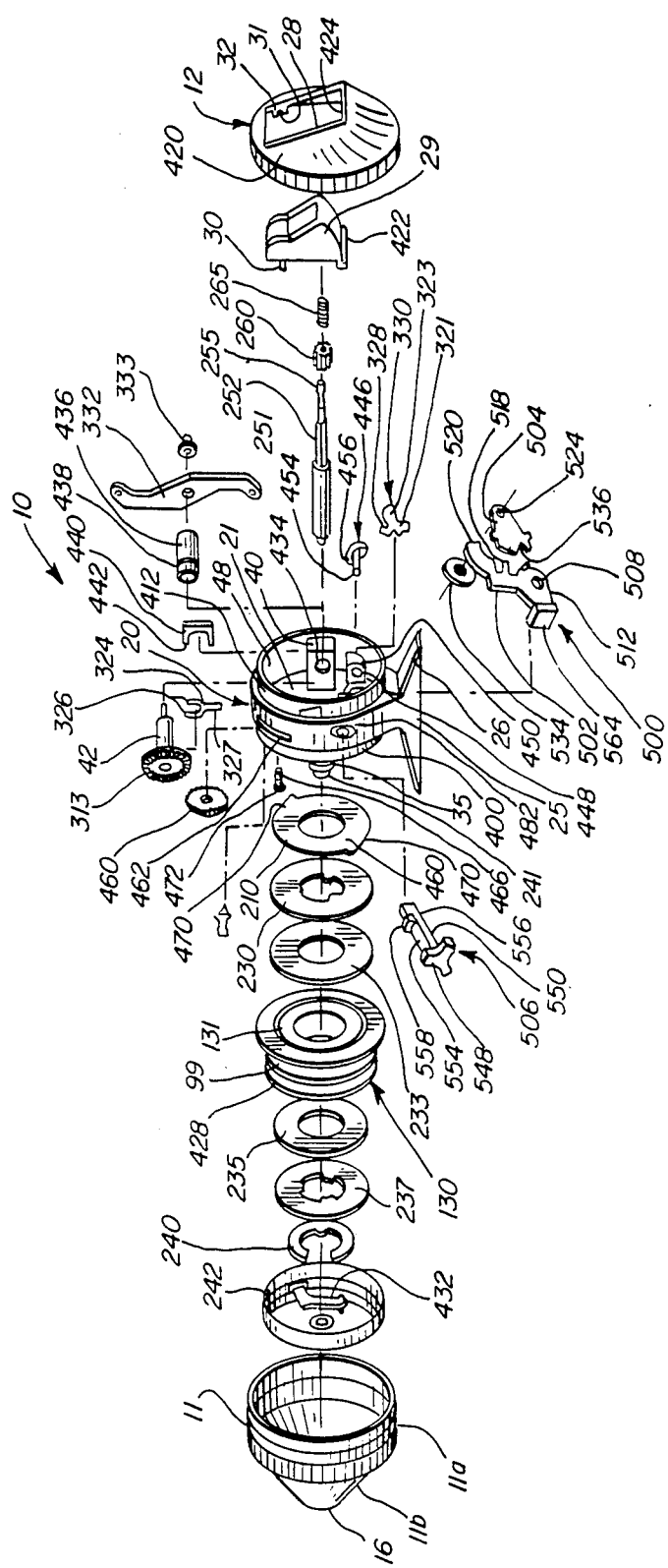
FIG. 1 is an exploded perspective view of a conventional style reel into which the present invention is incorporated.
Figure 2:
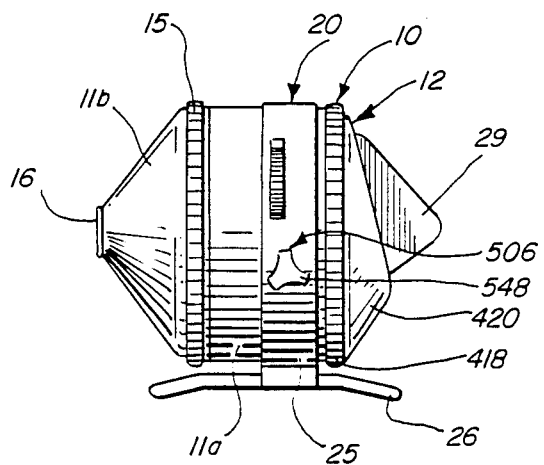
FIG. 2 is a left side elevation view of the assembled reel of FIG. 1.
Figure 3:
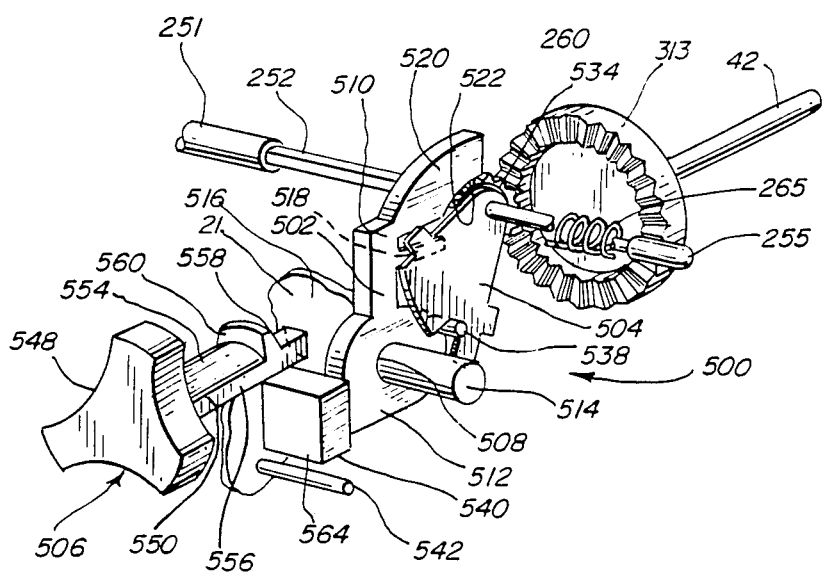
FIG. 3 is an enlarged perspective view of the parts of the present invention in position in the reel of FIG. 1.

Referring initially to FIG. 1, there is shown a reel 10 including a closed face housing having a reel body 20 to which is attached a front cup-shaped cover 11 and a rear cup-shaped cover 12. The front cover tapers radially forwardly from the cylindrical first part 11a to define a cone-shaped second part 11b. A circular line opening is provided in the conical second part 11b and mounts an annular line guide 16 in a conventional manner. The front cover 11 is removably attached with an annular rim 400 on the reel body 20 in a conventional manner. The rear cover 12 is removably attachable in a conventional manner with a rearwardly opening rim 412 associated with the back of the reel body 20.

The rear cover 12 has a sloped wall 420 defining a rectangular opening 28 for reception of a one-piece thumb button 29. The thumb button has a shape substantially mating with the shape of the opening 28 in the rear cover 12 and has a pair of sidewardly extending pivots 30 on the upper forward side edges thereof which engage in pivot openings 31 formed in the adjacent side walls 32 of the opening 28. A lip 422 extends laterally along the bottom edge of the thumb button 29. With the thumb button assembled from the inside of the cover 12, the pivots 30 are introduced to the slotted openings 31 in the walls 32 of the rear cover. The lip 422 abuts the edge 424 of the wall defining the bottom of the rectangular opening 28 to prevent the thumb button 29 from pivoting rearwardly out of the opening 28 in the rear cover 12.

The reel body 20 includes a transverse mounting plate or deck plate 21 and has an integrally molded, radially extending stem 25 with a mounting foot 26 on the outer end thereof for attachment to the appropriate part of a fishing rod (not shown).

A central hub 35 is formed with and projects forwardly of the deck plate 21 and receives in succession a drag plate 210, back spool washer 230, back flat drag washer 233, spool assembly 130, front flat drag washer 235, front spool washer 237, all of which are retained on the hub 35 by means of a spool retainer clip 240 which fits into a groove aligned with a shoulder separating the hub 35 from a reduced diameter and cam supporting front portion 241.

A centershaft 251 is slidably and rotatably mounted in a bore extending through the deck plate 21 and hub 35, with a spinner head assembly 242 threaded onto the forward threaded end of the shaft 251. The spinner head assembly 242 partially surrounds the forward flange 428 of the spool assembly 130 with a supply of fishing line 99 being wound on a spool 131 of the spool assembly 130. A pinion gear 260 is splined on a reduced diameter splined portion 252 of the centershaft 251 and is resiliently maintained in a forward position against the deck plate 21 by a centershaft spring 265 bearing against a stop 255 on the centershaft. The splined connection between the pinion gear 260 and centershaft 251 permits the axial sliding motion of the shaft 251 relative to the pinion gear 260 while at the same time rotation of the pinion gear 260 will rotate the centershaft 251.

Depressing the thumb button 29 moves the centershaft 251 and spinner head assembly 242 forward relative to the hub 35 to retract a pickup pin mechanism 432, mounted on spinner head assembly 242. Manipulating the thumb button in a conventional manner will provide a braking action to the line, will permit casting of the line or will permit retrieving the line onto the spool.

The deck plate 21 has a rearwardly projecting boss 40 with a laterally directed bore 434 for reception, in a concentric manner, of a crankshaft 42, surrounded by a cylindrical sleeve bearing 436. The bearing 436 has an annular groove 438 which, with the bearing properly aligned on the reel body 20 is in planar alignment with a slot defined at the rear of the deck plate 21 within a radially inward extension of the boss. A clip 440 surrounds the sleeve bearing 436 and resides within the groove 438, with forwardly projecting legs 442 of the clip 440 entering the slot in the deck plate 21. This arrangement assures proper positioning of the sleeve bearing 436 and prevents any lateral shifting thereof.

The crankshaft 42, with a main pinion gear 313 attached at one end is rotated in the sleeve bearing 436 in the boss 40 and has a handle 332 attached by means of a nut 333 to the other end of said crankshaft 42. The gear 313 meshes with the pinion gear 260 on the centershaft 251 so that rotation of the crank handle 332 will rotate the centershaft 251 and spinner head assembly 242.

An anti-reverse assembly 330, which is associated with the crankshaft 42, includes a ratchet (not shown in FIG. 1) fixed on the back of the gear 313 for rotation with the gear 313 and crankshaft 42. The anti-reverse assembly 330 includes a pivotable pawl 321, a pawl actuator 324 and a control member 446. The pawl actuator 324 has a pair of bifurcated legs 326 which grip the surface of the crankshaft 42 with sufficient force that the pawl actuator 324 will rotate with the crankshaft 42, but will slide relative to the crankshaft 42 when the gripping force is exceeded. An actuator tab 327 extends transverse to the plane of the pawl actuator 324 and engages in a recess 328 in the pawl 321. The pawl 321 will be situated with the pawl tooth 323 selectively aligned with the ratchet.

Independent, manual control of the pawl 321 is accomplished by the separate control member 446 mounted within a lateral bore 448 in a boss 450 spaced beneath the boss 40. The control member 446 is manipulable exernally of the reel body. Clockwise rotation of the control member 446, as viewed in FIG. 1, will pivot the pawl about the pivot tab 322 out of engagement with the ratchet. Thus movement of the crank handle 332 in either a clockwise or counterclockwise direction by the user, with the pawl 321 manually disengaged by the control member 446, will not effect movement of the pawl 321 and thus clockwise and counterclockwise crankshaft rotation will be uninhibited by the pawl 321.

Counterclockwise rotation of the control member 446 will allow the pawl 321 to be moved freely between two limiting positions so that rotation of the crank handle 332 in a counterclockwise direction, as viewed in FIG. 1, will pivot the pawl out of alignment with the teeth of the ratchet, whereupon the crank handle 323 will be permitted to be rotated in that direction without interference. In addition, with the control member 446 in the counterclockwise position, rotation of the handle 332 in the clockwise direction moves the pawl actuator 324 in the clockwise direction with the tab 327 pivoting the pawl 321 in a counterclockwise direcition to move the pawl into the path of the ratchet teeth to stop further rotation of the crankshaft 42 and handle 332 in that direction.

Drag actuation is effected by a knurled drag wheel 460 which is captured in and protrudes through a slot 462 beyond the outer surface of the reel body 20. The wheel 460 has a threaded bore and is suspended for rotation by a longitudinally directed bolt 466 extending through the spaced walls flanking the wheel 460.

The drag washer 210 has a substantially flat body 468 and has diametrically opposed tabs 470 bent perpendicularly in a common direction out of the plane of the body 468. The deck plate 21 has locating apertures for receiving each of the tabs 470. The one aperture is in direct alignment with the bolt 466 suspending the drag wheel 460. The forward end 472 of the bolt is slotted and is accessible through the one aperture to receive the one tab 470 of the drag plate 210.

This arrangement of the drag plate 210 prohibits rotation of the bolt 466 as the drag wheel 460 is manipulated. As a result, rotation of the drag wheel effects fore or aft movement of the bolt 460 relative to the reel body 20. Rotation of the wheel in a first direction forces the tab 470 and drag washer forwardly increasing drag braking pressure on the spool 131. Retraction of the bolt 466 and reduction of the braking pressure is accomplished by rotation of the drag wheel 460 oppositely to the first direction.

The reel is provided with an improved bait alert structure 500 having a knob 506 seated in boss 482 and is manipulable by the user between engaged and unengaged positions, with silent reel operation occurring with the knob 506 in the latter position. The bait alert structure 500 consists of an actuator 504, a clicker 502 and the knob 506 with the clicker 502 having a click finger 518 selectively engagable with the pinion 260 on the centershaft 251. The details of the construction and operation of the bait alert are set forth herein in the description of the preferred embodiment.

DESCRIPTION OF THE PREFERRED EMBODIMENT

The spin cast style reel described above is only exemplary of a reel within which the present invention can be incorporated. The inventive structure can be adapted to, for example, spinning, casting and other style reels.

Reference now is made to FIGS. 3–7 wherein the inventive structure is shown in detail. The bait alert structure at 500 is mounted rearwardly of the deck plate 21 and comprises the clicker 502, the actuator 504 and the manual override knob 506. The bait alert 500 is only operative when the control member 446 of the antireverse assembly 330 is set in the "off" position as will appear more clearly hereinafter.

The clicker 502 takes a substantially flat, L-shape and has a bore 508 at the juncture of the legs 510, 512 into which bore is closely fit a cylindrical post 514. The post 514 is integrally formed with the deck plate 21 and extends rearwardly therefrom so that the clicker is pivotable in a plane substantially parallel to the plane of the rearwardly facing surface 516 of the deck plate 21. The plane of pivoting of the clicker coincides with the splined pinion gear 260 on the center shaft 251.

The one leg 510 of the clicker 502 has a bendable, deflectable finger 518 integrally formed therewith and projecting substantially perpendicularly from the leg length. At the free end of the leg 510 is an offset 520 with a surface 522 that is curved to substantially match the outer diameter of the pinion gear 260. The clicker 502 can be pivoted about post 514 to present the curved surface 522 against the pinion to establish a substantial friction generating contact area. The surface 522 serves principally to limit the extent of clockwise rotation of the clicker in FIGS. 3-6.

With the surface 522 abutting the pinion gear, the finger 518 is forced against the teeth of the pinion gear and is preferably sufficiently long that it extends as far as the roots of adjacent teeth between which it extends.

Automatic operation of the clicker is accomplished through the actuator 504, which cooperates with the center shaft 251, which, in conjunction with the crank shaft 42, makes up the drive train transmitting motion between the crank handle 332 and the spinner head assembly 242. That is, as soon as the bait hits the water, the handle 332 is rotated clockwise just enough to actuate the pick-up pin 432 into the extended position. Hereinafter any pull on the line, i.e. a fish being caught, will tend to rotate the the spinner head 242 and the centershaft 251 in a counterclockwise direction. The actuator 504 is substantially flat and has an aperture 524 which accepts a reduced diameter portion 526 of the center shaft immediately behind the pinion gear 260. The forwardly facing surface 528 (FIG. 7) of the actuator 504 facially abuts the rearwardly facing surface 530 of the clicker. The actuator 504 is captive between the spring 265 at the rear of the center shaft and the pinion gear 260 and is thereby biasably maintained against the pinion gear 260. The thickness of the clicker is chosen so that with the clicker and actuator facially aligned, the forwardly facing surface of the actuator resides in slightly spaced relationship from the rearwardly facing surface 532 of the pinion 260. A friction pad 534 is interposed between the actuator 504 and pinion 260 and under the compressive force of the spring 265, causes a slip fit connection to be established between the actuator and pinion gear 260. Consequently, the actuator will follow movement of the crank shaft until a predetermined resistive force is encountered which is determined by the nature of the pad material 534 and the constant for the spring 265. With the actuator in place, the clicker is maintained in operative position on the cylindrical post without requiring any additional fasteners for the clicker.

The actuator has a radially outwardly opening V shaped slot 536 which cooperates with a post 538 on the clicker, which post extends rearwardly in alignment with the center shaft axis. The clicker is rotated by the actuator between its furthestmost clockwise position in FIG. 5 and its extreme counterclockwise position in FIG. 4 wherein an edge 540 on the leg 512 of the clicker abuts a post 542 projecting rearwardly from the deck plate 21.

FIG. 5 demonstrates the cooperative action of the clicker and actuator as the pinion is rotated in a counterclockwise direction shown by the direction of arrow 544, which occurs as line is being withdrawn from the reel. the counterclockwise rotation of the center shaft causes a corresponding movement of the actuator 504 which in turn effects a clockwise pivoting of the clicker about the post 514. As the clicker approaches the FIG. 5 position, the free end of the finger 518 initially contacts the pinion. The counterclockwise rotation of the pinion deflects the free end of the finger downwardly so that the free end bends as shown in FIG. 5. The bend guides the finger over successive teeth and, as the finger passes the peek of a tooth, the residual forces in the finger cause it to be propelled against the next adjacent tooth with a sharp rap which produces the audible clicking. The surface 522 confines the shifting of the clicker and assures that the finger is consistently located with respect to the pinion gear 260.

Thus it can be seen that as a fish draws out line, the clicking noise will be produced. As the user operates the crank handle 332 in response to the signal that line is being withdrawn, the center shaft moves in the direction of arrow 546 (FIG. 6) and the actuator 504 follows. This causes counterclockwise pivoting of the clicker in FIG. 6 and disengagement of the finger 518 from the pinion. The user can thereby continuously rotate the crank handle to retrieve line without any clicking noise.

It may be desirable to fix the clicker structure in the "off" position. This is accomplished through the knob 506. The knob 506 has an enlarged control head 548 and an integral, cylindrical body 550 for reception in a bore 552 in the boss 482 on the reel housing. The knob has a first leg 554 and a second spaced longer leg 556. The legs project axially through the bore in the boss in substantially parallel relationship. The short leg 554 has a ramped surface 558 which, upon introduction of the body 550 of the control knob into the bore deflects the leg 554 towards the other leg 556 sufficiently to permit simultaneous entry of both legs into the bore. In the fully seated position, the leg 554 springs back and seats an associated shoulder 560 against the boss to maintain the boss captive between the shoulder and the inwardly facing surface 562 of the enlarged head 548 on the knob.

The longer leg 556 extends sufficiently into the reel housing to coincide with the leg 512 of the clicker and coacts with a rearwardly projecting offset 564 on the leg 512. Because of its eccentric location the leg 556 will engage the offset 564 and move the clicker 502 upon rotation of the knob 506. The "off" position for the knob is depicted in FIG. 4. In this position, the leg 556 urges the clicker in a counterclockwise direction about the post 514 until the surface 540 abuts the post 542.

With the bait alert structure in the FIG. 4 setting, the actuator 504 will slip as the center shaft is rotated. By rotating the knob 180° to the FIG. 5 position, the clicker will no longer be dominated by the control knob and the clicker will respond to the movement of the actuator between the extreme clockwise and counterclockwise positions. It can be seen that the user has the option of either fixing the clicker in the "off" position or setting the knob for automatic operation of the bait alert structure.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

I claim:

1. In a fishing reel of the type having a spool for storing a supply of line and a crank handle operable through a drive train to direct line onto the spool, said drive train having a first member rotatable in a first direction with the crank handle operated to direct line onto the spool and rotatable oppositely to the first direction in response to the line being drawn off the spool, an improved bait alert comprising:
 a clicker;
 means mounting the clicker on the reel movably between a first position wherein a portion of the clicker contacts the first member and produces an audible clicking sound upon the first member being rotated and a second position wherein the portion of the clicker is spaced from the first member so that no clicking noise is generated between the portion of the clicker and first member upon the first member being rotated in the first direction; and
 actuator means for moving the clicker to its second position upon the first member rotating in the first direction and for moving the clicker to its first position upon the first member rotating oppositely to the first direction,
 whereby the user of the reel is alerted by the clicking noise to the fact that line is being drawn off of the reel as by a fish and upon the user retrieving line through operation of the crank handle the clicking noise is automatically stopped.

2. The improved bait alert according to claim 1 wherein override means are provided, means mount the override means to the reel for rotation about an axis transverse to the axis of rotation of the first member between on and off positions and in the on position of the override means the clicker is maintained thereby in its second position in spite of the first member rotating oppositely to the first direction of rotation.

3. The improved bait alert according to claim 2 wherein means frictionally maintain the actuator means on the first member so that the actuator means follows movement of the first member and under a predetermined force applied the actuator means slips relative to the first member.

4. In a fishing reel of the type having a spool for storing a supply of line, a crank handle operable through a drive train to direct line onto the spool, said drive train having a center shaft rotatable in a first direction upon the crank handle being operated to direct line onto the spool and rotatable in a direction opposite to the first direction in response to line being drawn off of the spool, a pinion gear with a generally cylindrical configuration and carried by the center shaft and a gear associated with the crank handle for transmitting movement of the crank handle through the pinion gear to the center shaft, an improved bait alert comprising:
 a clicker;
 means mounting the clicker movably between a first position wherein a portion of the clicker contacts the pinion gear to produce an audible clicking upon the center shaft rotating and a second position wherein the portion of the clicker is spaced from the pinion gear so that no clicking noise is generated between the portion of the clicker and pinion gear upon the shaft being rotated in said first direction; and
 actuator means for moving the clicker to its second position as an incident of the center shaft rotating in its first direction and for moving the clicker to its first position as an incident of the centershaft rotating oppositely to the first direction,
 whereby the user of the reel is alerted by the clicking noise to the fact that line is being drawn off of the reel as by a fish and upon the user retrieving line through operation of the crank handle the clicking noise is automatically stopped.

5. The improved bait alert according to claim 4 wherein the actuator means has a portion held biasably captive between a spring associated with the centershaft and the pinion gear.

6. The improved bait alert according to claim 4 wherein the reel has a deck plate, means mount the clicker to the deck plate for rotation about an axis substantially parallel to the rotational axis of the center shaft and the portion of the clicker that can be selectively brought into contact with the pinion gear has a deflectable finger having a curved surface conforming substantially to the curvature of the pinion gear.

7. The improved bait alert according to claim 4 wherein means mount the actuator means for frictional engagement with the centershaft so that the actuator means follows rotational movement of the centershaft.

8. The improved bait alert according to claim 7 wherein override means are provided to maintain the clicker in its second position in spite of the center shaft rotating oppositely to its first direction of rotation and means mount the override means for rotation between on and off positions about an axis transverse to the axis of rotation of the pinion gear and in said on position of the override means the clicker is maintained thereby in its second position.

9. The improved bait alert according to claim 8 wherein the reel has a housing and the override means comprises a knob mounted movably within the housing, said knob having a portion engagable with the clicker and said knob being movable between a first knob position wherein the knob portion contacts the clicker and prevents the clicker from moving out of its second position and a second knob position wherein the clicker can follow movement of the center shaft between the first and second clicker positions without interference from the knob portion.

* * * * *